United States Patent [19]
Cuomo et al.

[11] Patent Number: 6,012,092
[45] Date of Patent: Jan. 4, 2000

[54] METHOD AND SYSTEM FOR MANAGING MULTI-USER DATA FLOWS IN ENVIRONMENTS HAVING MINIMAL BANDWIDTH AND COMPUTATIONAL RESOURCES

[75] Inventors: Gennaro A. Cuomo, Apex; Sandeep Kishan Singhal, Raleigh, both of N.C.

[73] Assignee: International Business Machines Corp., Armonk, N.Y.

[21] Appl. No.: 08/846,339

[22] Filed: Apr. 30, 1997

[51] Int. Cl.[7] .................................................. H04L 12/24
[52] U.S. Cl. ............................................ 709/223; 709/229
[58] Field of Search ......................... 395/182.02, 200.31, 395/200.35, 200.33, 200.54, 200.55, 200.56, 200.59, 200.63; 370/254; 709/226, 223, 201, 229

[56] References Cited

U.S. PATENT DOCUMENTS

| | | | |
|---|---|---|---|
| 4,995,035 | 2/1991 | Cole et al. ............................... | 370/254 |
| 5,224,205 | 6/1993 | Dinkin et al. ............................ | 709/226 |
| 5,555,376 | 9/1996 | Theimer et al. ......................... | 709/229 |
| 5,617,540 | 4/1997 | Civanlar et al. ......................... | 709/224 |
| 5,664,170 | 9/1997 | Taylor ...................................... | 709/226 |
| 5,787,249 | 7/1998 | Badovinatz et al. .................... | 709/201 |
| 5,790,788 | 8/1998 | Badovinatz et al. .................... | 709/205 |
| 5,805,786 | 9/1998 | Badovinatz et al. ......................... | 714/4 |
| 5,805,820 | 9/1998 | Bellovin .................................. | 709/205 |

*Primary Examiner*—Zarni Maung
*Assistant Examiner*—Patrice Winder
*Attorney, Agent, or Firm*—A. Bruce Clay; Timothy J. O'Sullivan

[57] ABSTRACT

The overall management task required to determine data dissemination in multi-user applications is reduced herein. The management task required at any one host in the multi-user application is also limited. In addition, the number of simultaneous connections that any one participating host must support in a large multi-user application is reduced. Each user is assigned to a single management partition.

21 Claims, 7 Drawing Sheets

| USER | CONTACT | LOCATION | RADIUS | USERS IN CIRCLE |
|------|---------|----------|--------|-----------------|
| JOE | 9.67.12.92 : 9120 | (2, 3) | 2 | SUE |
| BOB | 9.24.9.6 : 6100 | (5, 2) | 2 | SUE |
| SUE | 9.111.3.53 : 7201 | (3, 2) | 1 | -- |

Prior Art
FIG. 4

METHOD AND SYSTEM FOR MANAGING MULTI-USER DATA FLOWS IN ENVIRONMENTS HAVING MINIMAL BANDWIDTH AND COMPUTATIONAL RESOURCES

BACKGROUND OF THE INVENTION

Multi-user applications, such as shared whiteboards, collaborative document editing, immersive 3D virtual environments, MUDs, and games are characterized by the need to exchange real-time information among the participating users. Typically, each user generates information that must be disseminated to one or more of the other participants. Traditionally, multi-user applications have been scheduled in advance and have had the benefit of accessing powerful server and bandwidth resources. These computational and bandwidth resources have facilitated the exchange of information among a large number of users.

When a multi-user application must be established on a spontaneous or ad hoc basis, these extensive computational and bandwidth resources are generally not available. For example, users may bring portable computers to a conference room and spontaneously establish a multi-user application session over a low-bandwidth wireless LAN. Similarly, users may connect to the Internet from their personal workstations via low-bandwidth dialup (telephone) links and initiate a multi-user application. In these situations, no one participant host possesses enough computational resources to support all users.

This combination of resource constraints poses two requirements on the multi-user application. First, each user cannot broadcast information to every other user because bandwidth is a limited resource. Instead, information can only be sent to the users who are specifically interested in receiving that data. Second, the computational overhead used to manage the bandwidth efficiently (e.g. to determine where data should be sent) must be minimized because the client hosts are not sufficiently powerful and because there is no high-power server resource available in the system.

Therefore, a need exists for a method and system for constructing data distribution lists on behalf of each participating user while limiting the computational overhead required to build those lists. By achieving these requirements (minimizing bandwidth and minimizing management computation) we can enable the deployment of large multi-user applications over low-bandwidth, low-computation systems.

SUMMARY OF THE INVENTION

The present invention relates to a method and system for reducing the overall management task required to determine optimal data dissemination in multi-user applications.

Another object of this invention is to limit the management task required at any one host in the multi-user application.

Yet another object of this invention is to reduce the number of simultaneous connections that any one participating host must support in a large multi-user application.

To achieve the foregoing objects and in accordance with the purpose of the invention as broadly described herein, a method and system are disclosed for partitioning of the management task required within a multi-user application. As a result of this partitioning, a method and system are disclosed for assigning each user to a single management partition.

These and other features, aspects, and advantages of the present invention will become better understood with reference to the following description, appended claims, and accompanying drawings.

BRIEF DESCRIPTION OF THE DRAWINGS

For a more complete understanding of the present invention and for further advantages thereof, reference is now made to the following Detailed Description taken in conjunction with the accompanying drawings, in which:

FIG. 4 shows the management services required to support proximity-based dissemination in accordance with the prior art;

DETAILED DESCRIPTION OF THE INVENTION

Figure 1:
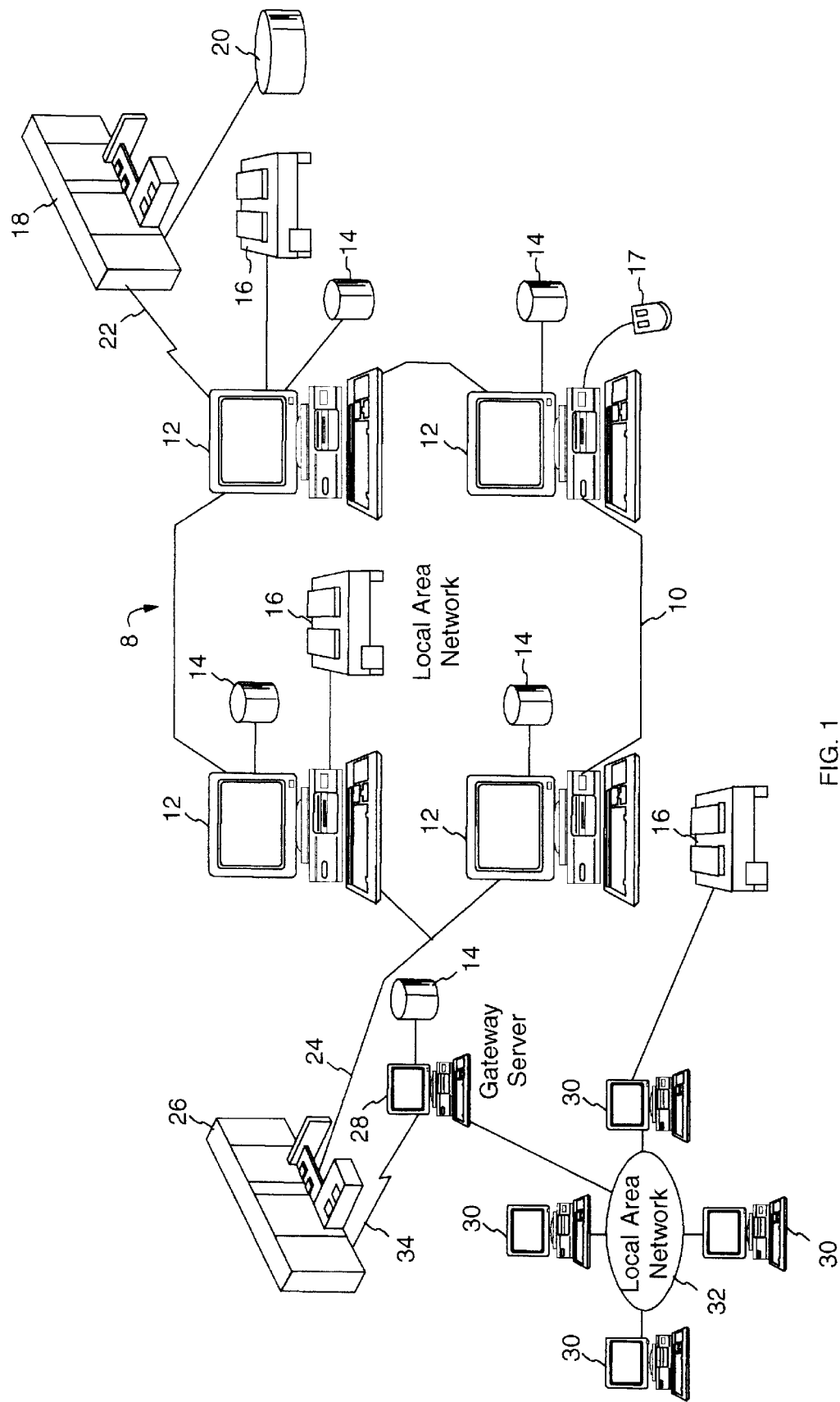
FIG. 1 is a pictorial representation of a data processing system which may be utilized to implement a method and system of the present invention.

Referring to FIG. 1, there is depicted a graphical representation of a data processing system 8, which may be utilized to implement the present invention. As may be seen, data processing system 8 may include a plurality of networks, such as Local Area Networks (LAN) 10 and 32, each of which preferably includes a plurality of individual computers 12 and 30, respectively. Of course, those skilled in the art will appreciate that a plurality of Intelligent Work Stations (IWS) coupled to a host processor may be utilized for each such network. Each said network may also consist of a plurality of processors coupled via a communications medium, such as shared memory, shared storage, or an interconnection network. As is common in such data processing systems, each individual computer may be coupled to a storage device 14 and/or a printer/output device 16 and may be provided with a pointing device such as a mouse 17.

The data processing system 8 may also include multiple mainframe computers, such as mainframe computer 18, which may be preferably coupled to LAN 10 by means of communications link 22. The mainframe computer 18 may also be coupled to a storage device 20 which may serve as remote storage for LAN 10. Similarly, LAN 10 may be coupled via communications link 24 through a sub-system control unit/communications controller 26 and communications link 34 to a gateway server 28. The gateway server 28 is preferably an IWS which serves to link LAN 32 to LAN 10.

With respect to LAN 32 and LAN 10, a plurality of documents or resource objects may be stored within storage device 20 and controlled by mainframe computer 18, as resource manager or library service for the resource objects thus stored. Of course, those skilled in the art will appreciate that mainframe computer 18 may be located a great geographic distance from LAN 10 and similarly, LAN 10 may be located a substantial distance from LAN 32. For example, LAN 32 may be located in California while LAN 10 may be located within North Carolina and mainframe computer 18 may be located in New York.

Software program code which employs the present invention is typically stored in the memory of a storage device 14 of a stand alone workstation or LAN server from which a developer may access the code for distribution purposes, the software program code may be embodied on any of a variety of known media for use with a data processing system such as a diskette or CD-ROM or may be distributed to users from a memory of one computer system over a network of some type to other computer systems for use by users of such other systems. Such techniques and methods for embodying software code on media and/or distributing software code are well-known and will not be further discussed herein.

Figure 2:
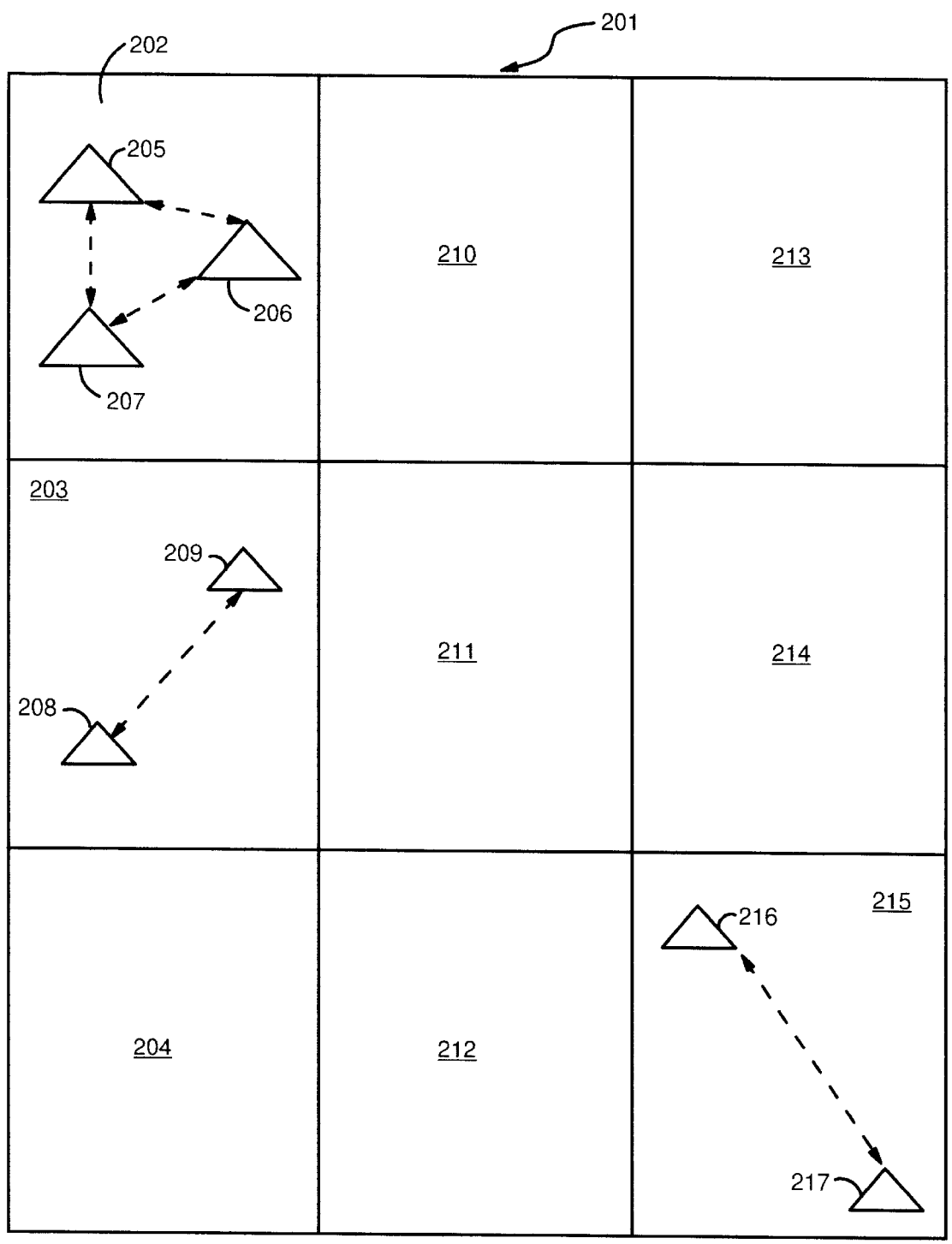
FIG. 2 shows a grid-based dissemination system in accordance with the prior art.

Referring to FIG. 2, a grid-based dissemination system in accordance with the prior art is illustrated. A game space, generally identified by a reference numeral 201, is partitioned into a set of fixed-size grids 202, 203, 204, 210, 211, 212, 213, 214, and 215. Within each grid, users exchange information with all other users. For example, user 205 in grid 202 transmits data to users 206 and 207 who are currently located within the same grid. Similarly, user 206 sends data to users 205 and 207. Moreover, user 208 in grid 203 only sends data to user 209.

In some implementations, data may also be sent to immediately adjacent grids. For example, data generated by a user in grid 202 would be sent to users in grids 202, 203, 210, and 211 but not to users in grids 204, 212, 213, 214, or 215. Although not shown, it is to be understood that a grid-based dissemination system may partition the game space 201 into arbitrary geometric regions, with rectilinear grids being just one partitioning example.

In grid-based dissemination systems, the set of destinations for transmitted data is easily determined once the transmitter determines in which region it is located. However, this approach does not minimize the bandwidth requirements for the application. For example, within grid 215, users 216 and 217 exchange information even though they are located on opposite sides of the grid. Consequently, the grid-based dissemination approach is not appropriate when bandwidth is a tightly restricted resource, though it is certainly an improvement over broadcast-based systems. In summary, grid-based approaches are most appropriate for medium-bandwidth networks with minimal computational resources.

Figure 3:
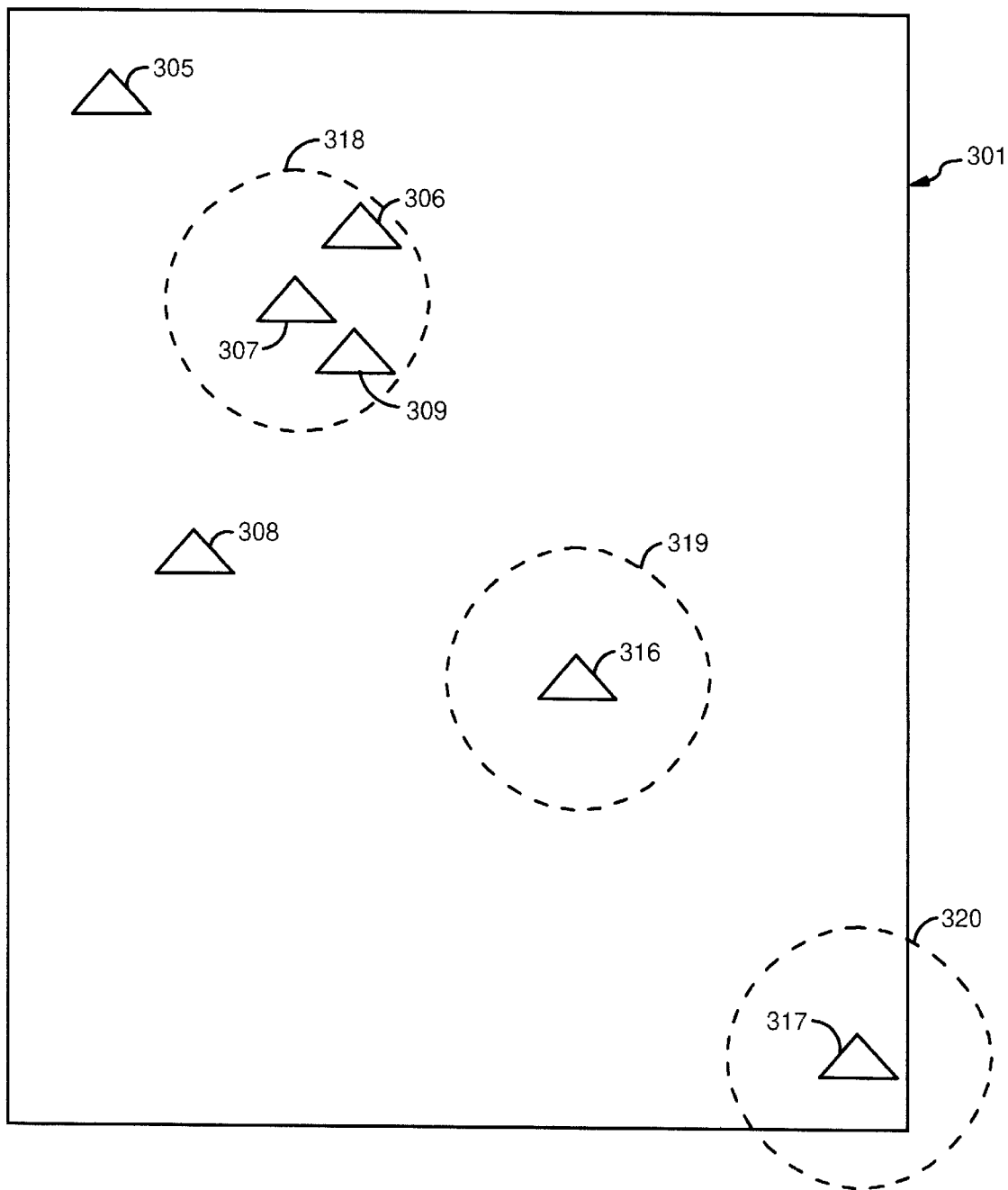
FIG. 3 shows a proximity-based dissemination system in accordance with the prior art.

Referring now to FIG. 3, a proximity-based dissemination system in accordance with the prior art is illustrated. A region 301 corresponds to the game space 201 shown in FIG. 2. To minimize bandwidth usage, each user only sends data to a set of users located within a particular predefined radial distance in the game space. For example, user 307 sends data to users 306 and 309, located within circle 318. On the other hand, users 316 and 317 do not send data to any recipients because no users are within their respective proximity circles 319 and 320. Although not shown in FIG. 3, it is to be understood that each user has their own proximity circle and data distribution list. Proximity-based systems may be implemented by having each source send to a dissemination list or by having each source transmit to a multicast address to which receivers subscribe.

Proximity-based dissemination systems impose the minimal bandwidth within a multi-user system. However, they require a management service to track the interests of participating users; this service either notifies each user as to whom he should disseminate data (i.e. which other users are interested in the information generated by that user) or notifies each user as to which multicast addresses he should subscribe (i.e. which users are disseminating data that is of interest to that user).

Referring now to FIG. 4, a management service for enabling a proximity-based dissemination system is shown. The service maintains a table which lists the participating users and a network address. For each user, the service records the user's current location within the game space and a radius of interest. Using this information, the service maintains a list of users located within each radius of interest.

The computational complexity of this management service increases quadratically with the number of users participating in the application. It is, therefore, inappropriate in environments that do not include powerful server machines, though it is effective in environments that have limited bandwidth. In summary, proximity-based approaches are most appropriate for low-bandwidth networks with high computational resources (which may be centralized or de-centralized). Therefore, the prior art methods do not teach a solution for the low-bandwidth and low computational resource combination.

Figure 5:
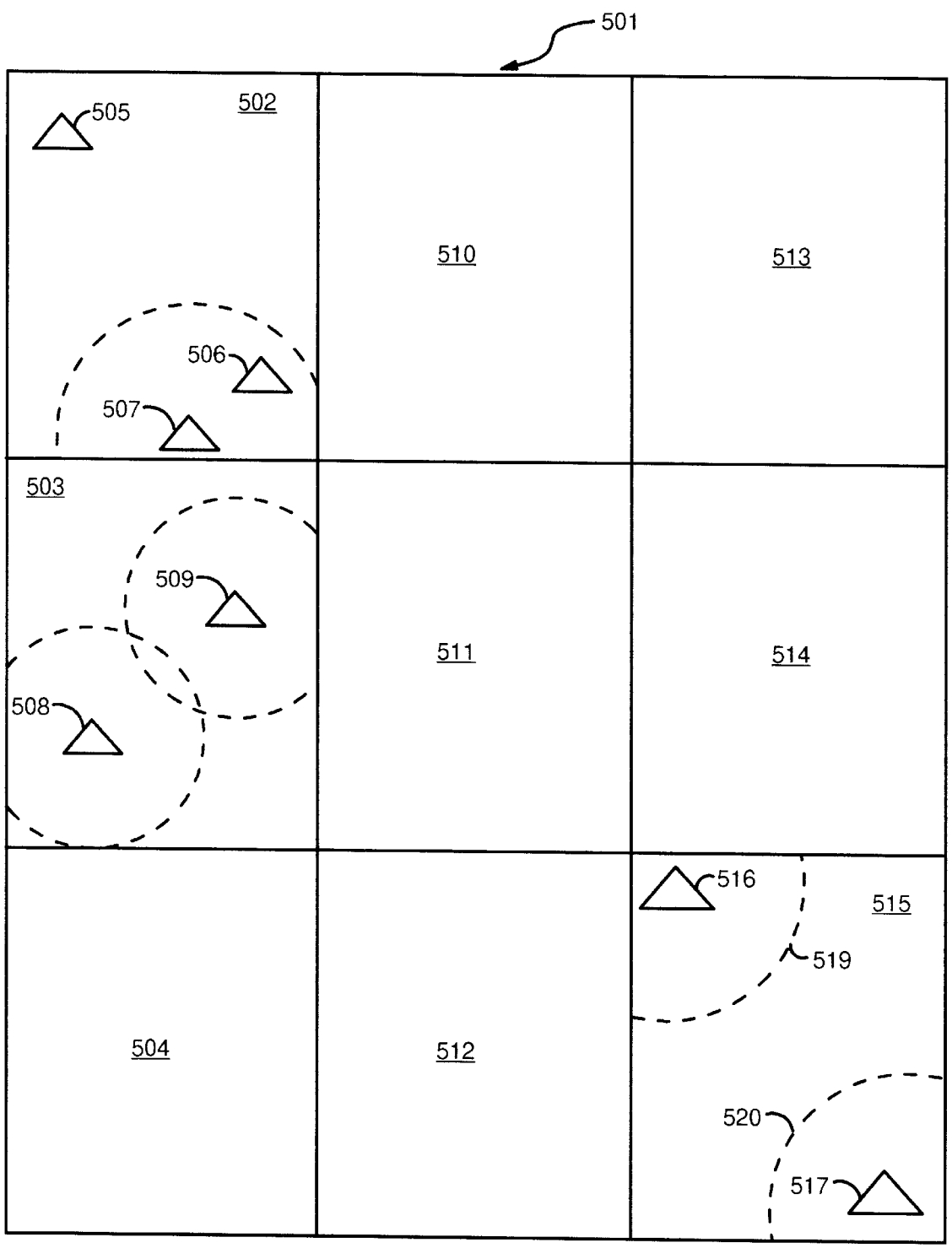
FIG. 5 shows a proximity-based dissemination system that uses grids to partition the management service, in accordance with the present invention.

Referring now to FIG. 5, a game space 501 is divided into grids 502, 503, 504, 510, 511, 512, 513, 514, and 515. Within each grid 502, 503, 504, 510, 511, 512, 513, 514, and 515, a proximity-based dissemination system is used. Like a grid-based dissemination system, data is only sent to users located in the current grid (or, optionally, to users in immediately adjacent grids). Moreover, like a proximity-based dissemination system, data is only sent to users who are located within a predefined radius of interest. For example, although users 516 and 517 are located within the same grid 515, they do not exchange information because neither lies within the other's radius of interest 519 and 520, respectively.

Figure 6:
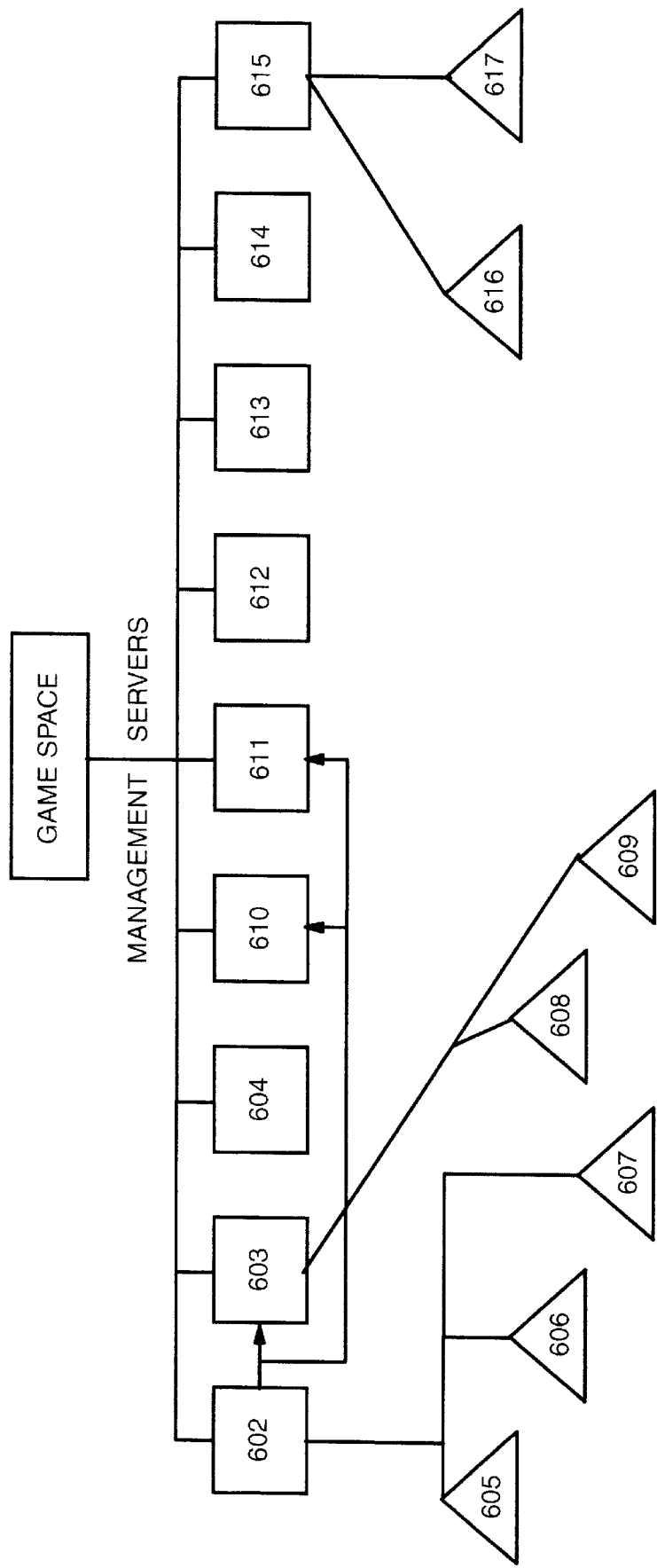
FIG. 6 shows the assignment of users to management domains in accordance with the present invention.

The underlying proximity-based dissemination system guarantees that data is only sent to the particular users who need to receive it. However, the underlying grid-based dissemination model permits the proximity management service to be partitioned. Referring now to FIG. 6, the proximity management task is divided among a set of servers 602, 603, 604, 610, 611, 612, 613, 614, and 615, corresponding respectively to grids 502, 503, 504, 510, 511, 512, 513, 514, and 515 in FIG. 5. Because the management task within each grid is relatively small, these partitioned management services may be deployed onto hosts having minimal computational resources. This partitioning, therefore, eliminates the need for any central server resource providing high computational capacity.

Once the management task is partitioned, individual users need only correspond with the particular server providing management services for the grid within which the user is currently situated. For example, in FIG. 6, users 605, 606, and 607 (corresponding to users 505, 506, and 507 in FIG. 5) are communicating with server 602 which corresponds to grid 502. The management server 602 may optionally forward some or all of that grid's data to management servers for the adjacent grids. For example, data transmitted by users 605, 606, and 607 may be forwarded to servers 603, 610, and 611 (corresponding to grids 503, 510, and 511 in FIG. 5) for potential forwarding to users 608 and 609 (corresponding to users 508 and 509 in FIG. 5).

Although in the preferred embodiment of this invention, the game space is partitioned into a fixed set of grids and a fixed set of servers (as shown in FIGS. 5 and 6), alternative embodiments might employ a hierarchical grid partitioning. For example, if the number of users in grid 502 (FIG. 5) exceeds the number that server 602 (FIG. 6) can reasonably handle given its limited computational capacity, then grid 502 might be subdivided; the management services previously provided by server 602 may subsequently be partitioned among an additional set of clients.

In this way, the computational load on and number of connections to any one management server is limited because that management server must handle only a small subset of the total users in the system. Furthermore, the bandwidth requirements of the overall system are minimized because data is only transmitted to the particular users who desire to receive this information. The grid-based dissemination model is being used for the non-obvious purpose of partitioning management overhead, rather than for the traditional task of determining the set of users to whom data should be disseminated.

Figure 7:
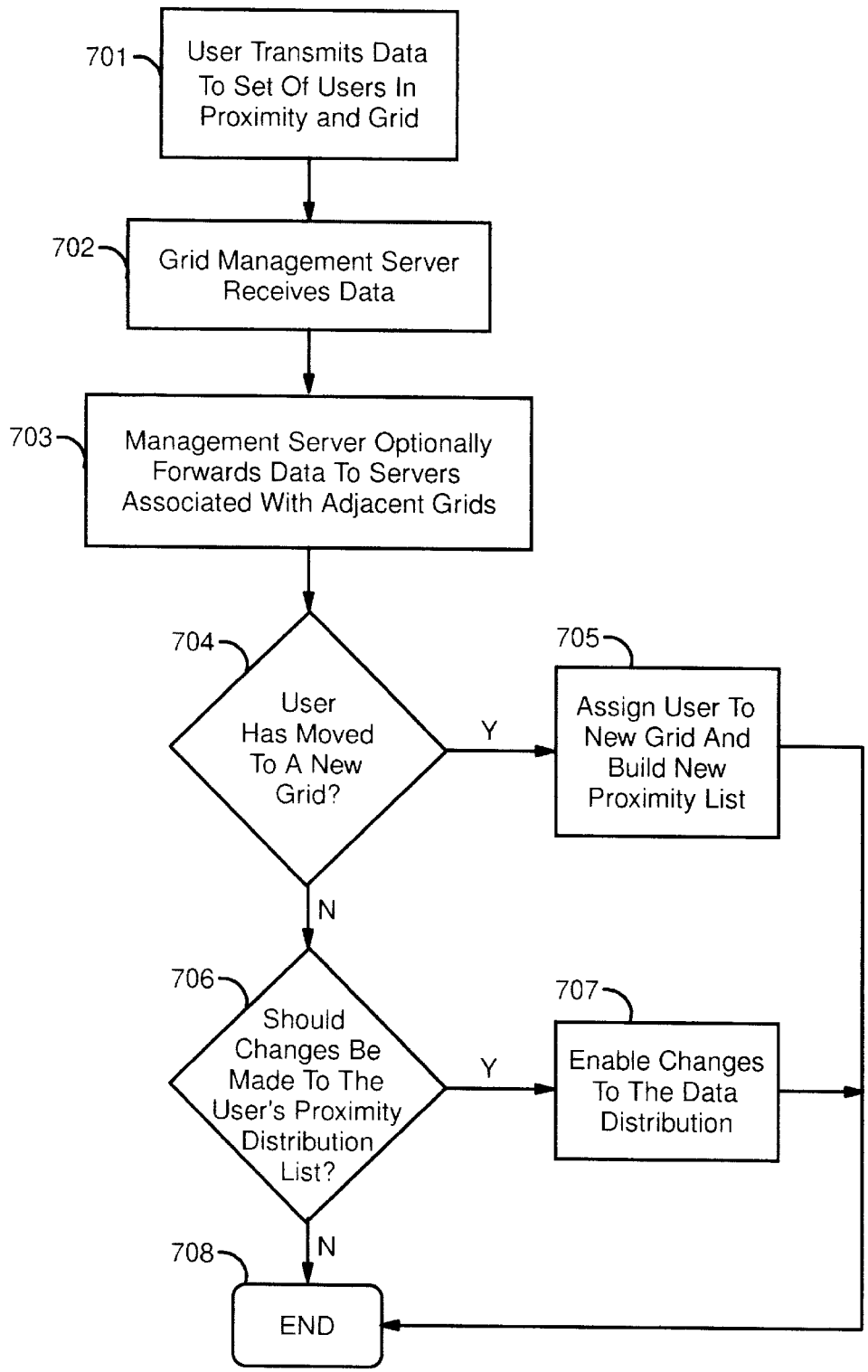
FIG. 7 shows a flowchart describing how data flows within a partitioned proximity management system.

Referring now to FIG. 7, we see a flowchart describing how data flows within the partitioned management system. In block 701, a user transmits data to the set of users in his grid who are also located within his proximity radius of interest. No assumption is made as to how that data is physically delivered to those destinations, whether directly by the transmitter or indirectly through a server or proxy. In block 702, the management server for the associated grid receives the data transmitted by that user. In block 703, the management server optionally forwards the data to management servers corresponding to adjacent grids in the game space; these adjacent management servers may forward the data to appropriate destination users within their grids. In decision block 704, the management server for the user's associated grid determines whether the user should be moved to another grid. If the answer to decision block 704 is yes, then in block 705, the user is transferred to the new grid and the associated management server constructs a new proximity list on behalf of that user. This proximity list includes users in the new grid who are located within that user's radius of interest. The present invention then ends at 708.

Continuing with FIG. 7, if the answer to decision block 704 is no, then in decision block 706, the management server determines whether the user's proximity list should be modified. If the answer to decision block 706 is yes, then in block 707 changes are made to the data distribution mechanism, either by notifying the user's host or by modifying a data distribution list maintained at the management server or a proxy. If the response to decision block 706 is no, the present invention ends at 708.

Although in the preferred embodiment of this invention, the game area is partitioned into geometric grids, alternative implementations may partition the users according to other (non-geometric) criteria. For example, in a collaborative document editing session, partitions may be based on portions of the document (e.g. chapter, section, etc.). Therefore, each of these partitions, whether based on grids or some other criteria, are referred to herein generically as an information domain.

Although the present invention has been described with respect to a specific preferred embodiment thereof, various changes and modifications may be suggested to one skilled in the art and it is intended that the present invention encompass such changes and modifications as fall within the scope of the appended claims.

What is claimed is:

1. A method of connecting a plurality of hosts in a network in which each of the hosts in the network generates data destined for a plurality of other hosts in the network, comprising the steps of:

categorizing the data among a plurality of information domains;

creating an association from each of the hosts in the network to reference one of said plurality of information domains;

partitioning management of communications among the hosts, wherein the partitioning of management of communications among the hosts is based on the information domains associated with the hosts; and managing dissemination of the data from the hosts in the network to a subset of hosts within one of said plurality of information domains referenced by said association.

2. The method of claim 1, further comprising the step of:

dynamically changing said association based on changes to the data disseminated by each of the hosts in the network.

3. The method of claim 1, further comprising the step of controlling communications between hosts in the subset of hosts within the same information domain based upon a category of information different from the category of information of the information domain of the subset of hosts.

4. The method of claim 1, wherein each host in the network communicates directly with the host for each of said plurality of information domains.

5. The method of claim 1, further comprising the step of:

dynamically creating a plurality of information subdomains within said plurality of information domains; and dynamically changing a plurality of said associations to reference one of said plurality of information subdomains.

6. The method of claim 1, wherein said step of managing employs a radius of interest assigned to each host in the network within said plurality of information domains.

7. The method of claim 1, wherein each of said plurality of information domains corresponds with a geometric region.

8. A system for connecting a plurality of hosts in a network in which each of the hosts in the network generates data destined for a plurality of other hosts in the network, comprising:

means for categorizing the data among a plurality of information domains;

means for creating an association from each of the hosts in the network to reference one of said plurality of information domains;

means for partitioning management of communications among the hosts, wherein the partitioning of management of communications among the hosts is based on the information domains associated with the hosts; and means for managing dissemination of the data from the hosts in the network to a subset of hosts within one of said plurality of information domains referenced by said association.

9. The system of claim 8, further comprising:

means for dynamically changing said association based on changes to the data disseminated by each of the hosts in the network.

10. The system of claim 8, further comprising means for controlling communications between hosts in the subset of hosts within the same information domain based upon a category of information different from the category of information of the information domain of the subset of hosts.

11. The system of claim 8, wherein each host in the network communicates directly with the host for each of said plurality of information domains.

12. The system of claim 8, further comprising:

means for dynamically creating a plurality of information sub-domains within said plurality of information domains; and means for dynamically changing a plurality of said associations to reference one of said plurality of information sub-domains.

13. The system of claim 8, wherein said means for managing employs a radius of interest assigned to each host in the network within said plurality of information domains.

14. The system of claim 8, wherein each of said plurality of information domains corresponds with a geometric region.

15. A computer program product recorded on computer readable medium for connecting a plurality of hosts in a network in which each of the hosts in the network generates data destined for a plurality of other hosts in the network, comprising:

computer readable means for categorizing the data among a plurality of information domains;

computer readable means for creating an association from each of the hosts in the network to reference one of said plurality of information domains;

computer readable means for partitioning management of communications among the hosts, wherein the partitioning of management of communications among the hosts is based on the information domains associated with the hosts; and computer readable means for managing dissemination of the data from the hosts in the network to a subset of hosts within one of said plurality of information domains referenced by said association.

16. The program product of claim 15, further comprising:

computer readable means for dynamically changing said association based on changes to the data disseminated by each of the hosts in the network.

17. The program product of claim 15, further comprising computer readable means for controlling communications between hosts in the subset of hosts within the same information domain based upon a category of information different from the category of information of the information domain of the subset of hosts.

18. The program product of claim 15, wherein each host in the network communicates directly with the host for each of said plurality of information domains.

19. The program product of claim 15, further comprising:

computer readable means for dynamically creating a plurality of information sub-domains within said plurality of information domains; and computer readable means for dynamically changing a plurality of said associations to reference one of said plurality of information sub-domains.

20. The program product of claim 15, wherein said computer readable means for managing employs a radius of interest assigned to each host in the network within said plurality of information domains.

21. The program product of claim 15, wherein each of said plurality of information domains corresponds with a geometric region.

* * * * *